(12) United States Patent
Cole

(10) Patent No.: US 6,714,589 B1
(45) Date of Patent: Mar. 30, 2004

(54) COMMUNICATION DEVICE WITH PRIMITIVE SYNCHRONIZATION SIGNAL

(75) Inventor: Terry L. Cole, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/477,200

(22) Filed: Jan. 4, 2000

(51) Int. Cl.$^7$ ................................................ H04B 1/38

(52) U.S. Cl. ...................................................... 375/222

(58) Field of Search ................................. 375/220, 221, 375/222, 354, 356; 370/280, 281, 294, 295, 329, 462, 485, 489, 503; 455/3.1, 5.1, 512, 507, 517

(56) References Cited

U.S. PATENT DOCUMENTS

| | | | | |
|---|---|---|---|---|
| 5,625,651 A | * | 4/1997 | Cioffi ........................... | 375/354 |
| 5,644,573 A | * | 7/1997 | Bingham et al. ............ | 370/503 |
| 5,822,328 A | * | 10/1998 | Derby et al. ................. | 370/507 |
| 5,838,659 A | * | 11/1998 | Kainulainen ................. | 370/216 |
| 5,872,821 A | * | 2/1999 | Schoffel ....................... | 375/371 |
| 5,940,744 A | * | 8/1999 | Uda .............................. | 455/75 |
| 6,081,535 A | * | 6/2000 | Nam et al. ................... | 370/466 |
| 6,101,213 A | * | 8/2000 | Van Allen .................... | 375/130 |
| 6,256,326 B1 | * | 7/2001 | Kudo ............................ | 370/512 |
| 6,449,494 B1 | * | 9/2002 | Cashman ...................... | 455/553.1 |
| 6,473,438 B1 | * | 10/2002 | Cioffi et al. .................. | 370/468 |

FOREIGN PATENT DOCUMENTS

| | | |
|---|---|---|
| EP | 0806852 A2 | 11/1997 |
| WO | WO95/34149 | 12/1995 |
| WO | WO97/25788 | 7/1997 |

OTHER PUBLICATIONS

International Search Report dated Jul. 12, 2000 for International application No. PCT/US00/21753 Filed Aug. 8, 2000.

International Telecommunication Union; Telecommunication Standardization Sector; COM 15–134R1–E, Study Group 15—Contribution 134; Editor Recommendation G.994.1, "Draft New Recommendation G.994.1—Handshake Procedures for digital Subscriber Line (DSL) Transceivers—For Approval," Study Period 1997–2000, Mar. 1999.*

International Telecommunication Union; Telecommunication Standardization Sector; COM 15–136–E, Study Group 15—Contribution 136; Editor Recommendation G.992.2, "Draft New Recommendation G.992.2—Splitterless Asymmetric Digital Subscriber Line (ADSL) Transceivers—For Approval." Study Period 1997–2000, Mar. 1999.*

(List continued on next page.)

*Primary Examiner*—Emmanuel Bayard
(74) *Attorney, Agent, or Firm*—Williams, Morgan & Amerson (57) ABSTRACT

A communications system includes a first modem and a second modem. The first modem is adapted to modulate and demodulate data in accordance with a set of operating parameters and transmit a request to change one of the operating parameters. The second modem is coupled to the first modem and adapted to modulate and demodulate data in accordance with the set of operating parameters, receive the request to change one of the operating parameters, and send a primitive synchronization signal to the first modem. The first modem is adapted to implement the change in response to receiving the primitive synchronization signal. A method for communicating messages requiring synchronization includes receiving symbols in a modem; analyzing the symbols to identify a primitive synchronization signal; and modifying a physical layer operating parameter of the modem in response to identifying the primitive synchronization signal.

43 Claims, 3 Drawing Sheets

OTHER PUBLICATIONS

Committee T1—Telecommunications, Working Group T1E1.4 T1E1.4/98–007R5, Plano, TX; Nov. 30–Dec. 4, 1998. Draft Standard, "T1.413 Issue 2," Project: Standards Project for Interfaces Relating to Carrier to Customer Connection of Asymmetrical Digital Subscriber Line (ADSL) Equipment.

International Telecommunication Union; Telecommunication Standardization Sector; G.992.1 Editor Final Version, Editor Recommendation G.992.1 (ex G.dmt), "Draft New Recommendation G.992.1—Asymmetrical Digital Subscriber Line (ADSL) Transceivers—Approved," Study Period 1997–2000, Jul. 1999.

* cited by examiner

COMMUNICATION DEVICE WITH PRIMITIVE SYNCHRONIZATION SIGNAL

BACKGROUND OF THE INVENTION

1. Field of the Invention

This invention relates generally to communication devices, and, more particularly, to a communication device that employs a synchronous primitive signal for coordinating synchronous events.

2. Description of the Related Art

In communications systems, particularly telephony, it is common practice to transmit signals between a subscriber station and a central switching office via a two-wire, bi-directional communication channel. The Plain Old Telephone System (POTS), designed primarily for voice communication, provides an inadequate data transmission rate for many modern applications. To meet the demand for high-speed communications, designers have sought innovative and cost-effective solutions that take advantage of the existing network infrastructure. Several technological advancements have been proposed in the telecommunications industry that make use of the existing network of telephone wires. One of these technologies is the xDSL technology. DSL technology uses the existing network of telephone lines for broadband communications. An ordinary twisted pair equipped with DSL interfaces can transmit videos, television, and high-speed data.

DSL technologies typically leave the POTS service undisturbed. Traditional analog voice band interfaces use the same frequency band, 0–4 Kilohertz (kHz), as telephone service, thereby preventing concurrent voice and data use. A DSL interface, on the other hand, operates at frequencies above the voice channels from 100 kHz to 1.1 Megahertz (MHz). Thus, a single DSL line is capable of offering simultaneous channels for voice and data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS). The transfer rate of 1.5 MBPS, for instance, is fifty times faster than a conventional 28.8 kilobits per second (KBPS) transfer rate.

One popular version of the DSL technology is the Asymmetrical Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface," the most recent revision of which as of the filing date of this specification is incorporated herein by reference in its entirety.

ADSL modems use two competing modulation schemes: discrete multi-tone (DMT) and carrierless amplitude/phase modulation (CAP). DMT is the standard adopted by the American National Standards Institute. The technology employed by DMT ADSL modems is termed discrete multi-tone. The standard defines 256 discrete tones. Each tone represents a carrier signal that can be modulated with a digital signal for transmitting data. The specific frequency for a given tone is 4.3125 kHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

In present ADSL implementations, bits are allocated to different carriers according to a "loading" algorithm, such as the Water Filling (WF) algorithm or Equal Energy Distribution (EED) algorithm, for example. The aforementioned loading algorithms utilize the signal-to-noise ratio (SNR) profile of a channel and a desired SNR margin to allocate bits. In general, carriers with higher SNR are able to carry more bits than those with lower SNR values. Typically, increasing the desired margin reduces the number of bits that can be carried by a given carrier. These loading algorithms typically attempt to establish either a maximum throughput or start with a predetermined throughput and distribute the bits required to support that throughput to the least impaired tones. After the modem has been trained, dynamic rate adaptation or bit swapping techniques may be used to change the bit rate in response to improving or degrading line conditions.

Modems typically have a layered architecture. The first layer, referred to as the physical layer (PHY) or level 1 is responsible for bit processing functions, such as error checking, modulating, demodulating, scrambling, etc. Signals or messages provided by the physical layer are often referred to as primitive signals, as they do not require interaction with higher levels for detection. The next layer, often referred to as level 2 is responsible for data framing and management functions. Current ADSL receivers employ a combination of level 1, level 2, and physical link management. Level 2 messages are multiplexed into a level 2 data frame and modulated in the level 1 signal. Physical link management messages are communicated in the layer 2 messages, some of which alter the format of the level 1 signal. One such type of physical link management message is a bit swap message used to adaptively change the number of bits or signal strength associated with a particular tone.

A known bit swapping technique is described in U.S. Pat. No. 5,400,322 and incorporated herein by reference in its entirety. The technique involves sending a bit swap request message to the opposing modem informing the opposing modem of the impending bit swap. The opposing modem sends a reply message including a symbol counter value at which to implement the bit swap. Another known technique, described in U.S. Pat. No. 5,479,447 uses a handshaking procedure that implements the bit swap a predetermined number of symbols after receipt of the acknowledgement message. At least one disadvantage of these techniques is that they both assume proper functioning of the modems' higher level message processing layers to implement operating parameter changes in the physical layer. Also, the exchange protocol is not entirely robust in that the modem sending the acknowledgement message does not affirmatively know that the other modem has received the acknowledgement. A bit error in the multiplexed message may prevent the acknowledgment from being recognized. Accordingly the acknowledging modem could change its operating parameters undesirably and lose its communication link.

To illustrate the complexity of the exchange necessary to transfer and act upon bit swap messages, consider the following illustration. Bit swap messages include encoded parameters that are buffered. During each superframe (i.e., predetermined number of grouped frames there are a small number of bytes available to encode commands, such as bit swap commands. The buffered commands are transferred incrementally, superframe by superframe, byte by byte. Thus, a bit swap message may span more than one superframe. Error checking codes are added during each superframe. The error checking is also completely independent of the bit swap message, so bit swap messages may be included in more than one RS coding block. The bytes get mixed with all the other bytes, including other overhead messages, framing messages, and user bytes. The bits of all these bytes get mixed up per the bit ordering sequence and assigned to tones. The bytes of the bit swap message may end up on different tones and may share tones with other types of information. Eventually the bits are modulated and transferred to the receiving modem. For the bit swap message to finally get received, the inverses of all the processes described above must be successfully be performed.

The present invention is directed to overcoming, or at least reducing the effects of, one or more of the problems set forth above.

SUMMARY OF THE INVENTION

One aspect of the present invention is seen in a communications system including a first a modem and a second modem. The first modem is adapted to modulate and demodulate data in accordance with a set of operating parameters and transmit a request to change one of the operating parameters. The second modem is coupled to the first modem and adapted to modulate and demodulate data in accordance with the set of operating parameters, receive the request to change one of the operating parameters, and send a primitive synchronization signal to the first modem. The first modem is adapted to implement the change in response to receiving the primitive synchronization signal.

Another aspect of the present invention is seen in a method for communicating messages requiring synchronization. The method includes receiving symbols in a modem; analyzing the symbols to identify a primitive synchronization signal; and modifying a physical layer operating parameter of the modem in response to identifying the primitive synchronization signal.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
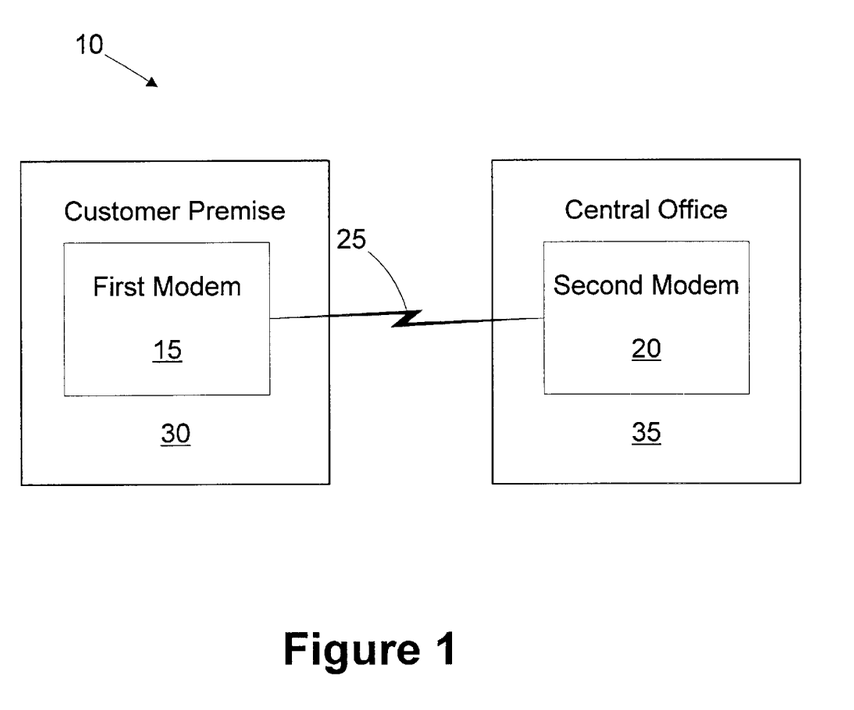
FIG. 1 is a simplified block diagram of a communications system in accordance with the present invention.

Referring to FIG. 1, a block diagram of a communications system 10 is provided. The communications system 10 includes a first modem 15 coupled to a second modem 20 through a connection 25. In the illustrated embodiment, the first modem 15 is located at a customer premise 30, and the second modem 20 is part of a central office 35. The connection 25 is an ordinary twisted pair connection, as is common in present-day telephone networks. However, other connection types (e.g., wireless, cellular, etc.) are contemplated, depending on the specific implementation. Also, it is contemplated that the second modem 20 may not be part of the central office 35, but rather the second modem 20 may be installed in a second customer premise (not shown). For purposes of illustration, the modems 15, 20 are described as they might be implemented under the ADSL protocol (ANSI T1.413). It is contemplated that the techniques described herein may be applied to other communication protocols, depending on the specific implementation. The functions described herein may also be implemented in other communications devices other than modems.

In the illustrated embodiment, the second modem 20 acts as a gateway to a larger communications network (not shown), such as a local or wide area network, or the Internet. Typically, the first modem 15 establishes a connection to the communications network (not shown) through the second modem 20. During the process of establishing the connection, the first and second modems 15 and 20 complete a training process whereby an initial bit loading technique (e.g., water filling, equal energy distribution, etc.) is employed to establish the throughput available for communication between the modems 15, 20.

Although the present invention is described as it may be implemented in a modem, it is contemplated that, in light of this disclosure, the invention may be applied to any type of transceiver, including, but not limited to, a modem or some other wired or wireless communication device.

Figure 2:
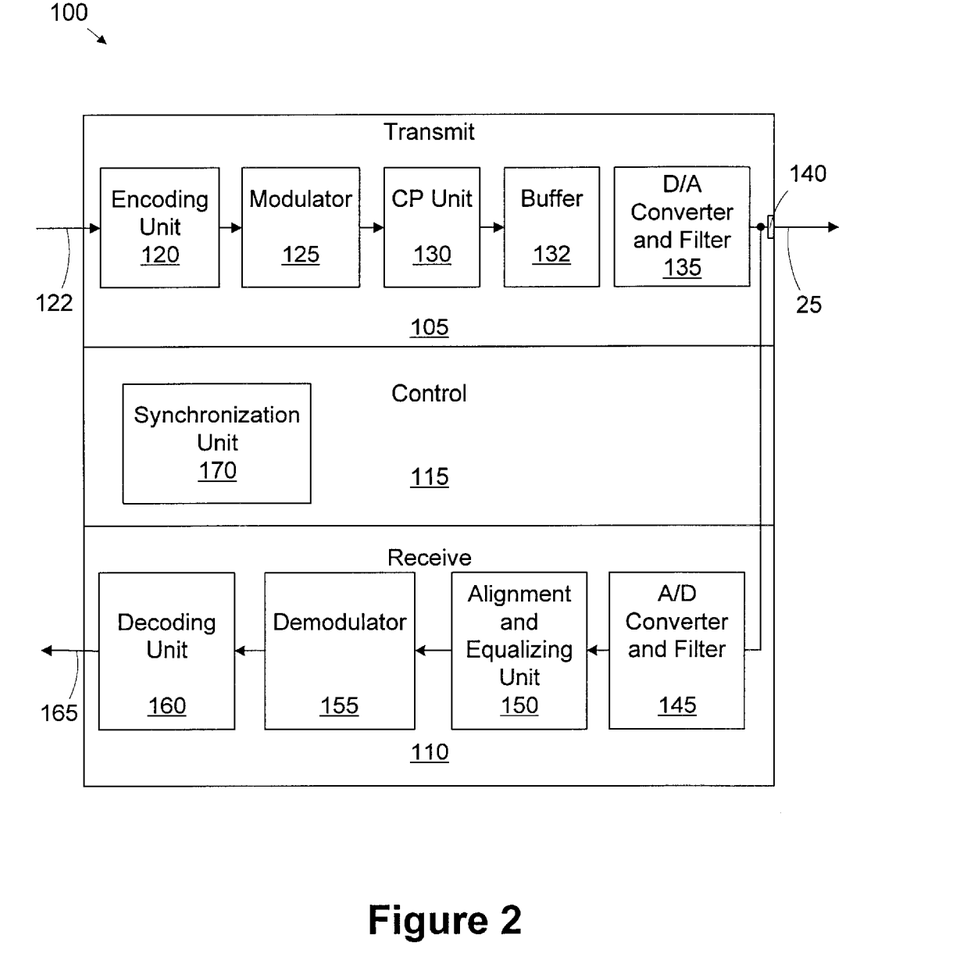
FIG. 2 is a simplified block diagram of a modem in the communications system of FIG. 1.

Referring to FIG. 2, a simplified block diagram of a modem 100 is provided. The modem 100 may be the first modem 15 or the second modem 20. For clarity and ease of illustration, not all functional blocks are illustrated in detail because these items are known to those of ordinary skill in the art, and are further defined in well known modem standards.

The modem 100 includes transmit, receive, and control functional blocks 105, 110, 115. The transmit block 105 includes an encoding unit 120 adapted to receive outgoing digital data over a data-out line 122. The encoding unit 120 performs functions such as cyclic redundancy checking (CRC), scrambling, forward error correction, and interleaving. As stated above, these functions are known to those of ordinary skill in the art.

The data in binary form is grouped into sets referred to as frames. A plurality of frames (i.e., 68 in the illustrated embodiment) is referred to as a superframe. The transmit block 105 also includes a modulator 125 that receives the data frames from the encoding unit 120 and modulates a carrier or carriers with the data. The modulator 125 performs tone ordering, constellation encoding, gain scaling, and an inverse discrete Fourier transform (IDFT) function to provide time domain waveform samples. The set of time domain waveform samples corresponding to a frame of data is referred to as a symbol. A cyclic prefix (CP) unit 130 performs cyclic prefix insertion (i.e., a subset of the output samples from the modulator 125 is replicated and prepended to the existing output samples to provide an overlap and allow for better symbol alignment). A buffer 132 stores the samples received from the CP unit 130. A digital to analog (D/A) converter and filter 135 converts the samples from the CP unit 130 to an analog waveform suitable for transmission over the connection 25 through an external line interface 140.

The receive block 110 includes an analog to digital (A/D) converter and filter 145 that receives an analog waveform over the connection 25 and samples the analog waveform to generate a time domain digital signal. An alignment and equalizing unit 150 performs functions known in the art, such as symbol alignment and time domain equalization. In time domain equalization, because the tones are at different frequencies, certain frequencies travel faster than others, and as such, all the tones do not arrive at same time. The time domain equalization function of the alignment and equalizing unit 150 delays the faster tones to compensate for the propagation speed differences. There is a performance trade off between the symbol alignment and time domain equalization functions in that a higher degree of symbol alignment accuracy allows a lesser degree of accuracy in time domain equalization. Cyclic prefix insertion improves symbol alignment accuracy. The alignment and equalizing unit 150 also performs gain control to increase the amplitude of the received signal.

A demodulator 155 receives the time domain samples from the alignment and equalizing unit 150 and converts the time domain data to frequency domain data. The demodulator 155 performs a slicing function to determine constellation points from the constellation encoded data, a demapping function to map the identified constellation point back to bits, and a decoding function (e.g., Viterbi decoding if trellis constellation coding is employed). In the case where the modem operates using the ADSL protocol, the demodulator 155 also performs tone deordering to reassemble the bytes that were divided among the available tones. A decoding unit 160 in the receive block 110 performs forward error correction, CRC checking, and descrambling functions on the data received from the demodulator 155. The reconstructed data provided by the decoding unit 160 represents the sequential binary data that was sent by the interfacing modem (not shown). The reconstructed data is provided to a data-in line 165.

The control block 115 includes a synchronization unit 170 for communicating primitive synchronization signals for events requiring synchronization with the opposing modem (not shown). As described above, certain messages, such as bit swap messages are level 2 messages that cause a change in the operation of the physical layer functions performed by the transmit and receive blocks 105, 110. As used herein a primitive signal is a signal (e.g., waveform) or message (e.g., bits) that does not require interaction with the level 2 functions to be understood. The application of the present message is not limited to Level 2 messages, as even higher levels of multiplexing using a more complex language may encoded.

Receipt of the primitive synchronization signal is an affirmative indication that the sending modem is ready to implement the change to the physical layer operations. The operation of the synchronization unit 170 is described as it may be implemented in an independent unit, however, it is contemplated that the functions may be integrated into other units in the transmit and receive blocks 105, 110.

The following example illustrates how the synchronization unit 170 operates during a bit swap evolution. As defined in the ADSL standard, the modem 100 may change the number of bits by issuing a bit swap request over the ADSL overhead channel (aoc). Typically, a bit swap request is initiated in response to a change in the operating characteristics of the line (e.g., increase or decrease in impairments). Consider the case where the modem 15 is requests a bit rate change from the modem 20 at the central office 30. The modem 15 sends a bit swap request message (i.e., a level 2 message embedded in the data frame) to the modem 20 to increase or decrease the number of bits for a particular tone. An aoc message includes a message header (i.e., 11111111) that signals the modem 20 of the impending aoc message. The message header is followed by an 8-bit command field. Per the ADSL standard, a command field value of 00000001 designates increasing the number of allocated bits by one and a command field value of 00000010 designates decreasing the number of allocated bits by one. The command field is followed by an 8-bit tone index designating the particular tone for which to change the number of bits. The ADSL standard also defines an extended bit swap request where the number of bits for a plurality of channels can be changed simultaneously. The extended bit swap request message includes a message header of 11111100. Six command field and tone index pairs are transmitted to designate the type of change and the particular tone.

The bit swap request message (i.e., normal or extended) may be repeated by the modem indefinitely until the request is acknowledged. Alternatively, the request may be repeated a predetermined number of times. After receiving the bit swap request, the modem 20 at the central office 30 responds with a bit swap acknowledge message (i.e., also a that includes a message header (e.g., 11111111), an acknowledge command (e.g., 11111111). Again, the acknowledgement message may be repeated indefinitely or for a predetermined number of times. Upon receipt of the acknowledge message, the modem 15 that initiated the bit swap request is affirmatively aware that the other modem 20 is expecting a physical layer change.

The synchronization unit 170, after receiving indication of the acknowledgement message (e.g., a trigger bit set in a register (not shown)) sends a primitive synchronization signal to the other modem 20. Because primitive signals are detected in the physical layer, there is a higher probability that it will be received and understood by the modem 20. Upon receipt of the primitive synchronization signal, the modem 20 implements the operating parameter change. The modem 20 may implement the change for the current frame that includes the primitive synchronization signal, or at some predetermined number of frames, superframes, or symbols thereafter. Because the trigger for the operating parameter change is a primitive signal, as opposed to a level 2 message, the reliability of the exchange is increased, thereby reducing the probability that one modem 15, 20 will implement the change without the other.

This increased reliability is illustrated below by the following exemplary primitive signaling methods. The primitive synchronization signal may be either a signal or a message. A physical layer data frame may be defined as the raw bits generated from the symbol by the demodulator 155 (i.e., after the tone deordering). A message may be embedded in the physical layer data frame in a number of ways. For example, the bits associated with a predetermined tone or known good tone could be reserved for the primitive synchronization signal. If the bits match a predetermined pattern, receipt of the primitive synchronization signal is recognized. The bits may include a checksum or cyclic redundancy check component to increase the reliability of the message transfer. Another technique is to modulate the message onto the most significant bits of several tones. Because the most significant bits are the most reliable, the probability of message identification is increased. The message could be encoded onto tones normally reserved for peak to average ratio (PAR) reduction in another embodiment.

Still another example of a primitive synchronization technique is to dedicate of the primitive is to use some of the tones exclusively for primitive signaling modulation. In other words, an independent transmission path may be formed using some of the tones, and these tones could be used for primitive level communications to control the rest of the tones. The commands implemented, such as bit swap requests would have no effect on the channel (i.e., dedicated tones) used to carry the message, thus achieving a higher degree of separation. One way to implement such a dedicated path is to use the simple G.handshake modulator that is typically used to start an ADSL connection. This modulator could simply be kept running and used to carry physical layer to physical layer communication independent of the more complex modulation existing for the standard ADSL transmissions.

Various signaling techniques may also be used to generate the primitive synchronization signal. For example, the primitive synchronization signal may comprise a predetermined number of consecutive synchronization symbols, the stoppage of the signal for a predetermined number of symbols, a phase reversal of the pilot tone for one or more symbols, a phase reversal of the synchronization symbol for one or more superframes.

The particular signal constructs described above for generating signals and messages are provided for illustrative purposes. It is contemplated that many signal and message constructs are possible depending on the specific application.

In another embodiment, the bit swap request from the initiating modem 15, may be followed by a primitive acknowledgement signal from the opposing modem 20 instead of the normal level 2 acknowledgement message. The initiating modem 15 may then choose to implement the operating parameter change immediately upon receipt of the primitive acknowledgement signal, or send a subsequent primitive synchronization signal. The exchange of complimentary primitive signals further increases the reliability of the exchange.

Figure 3:
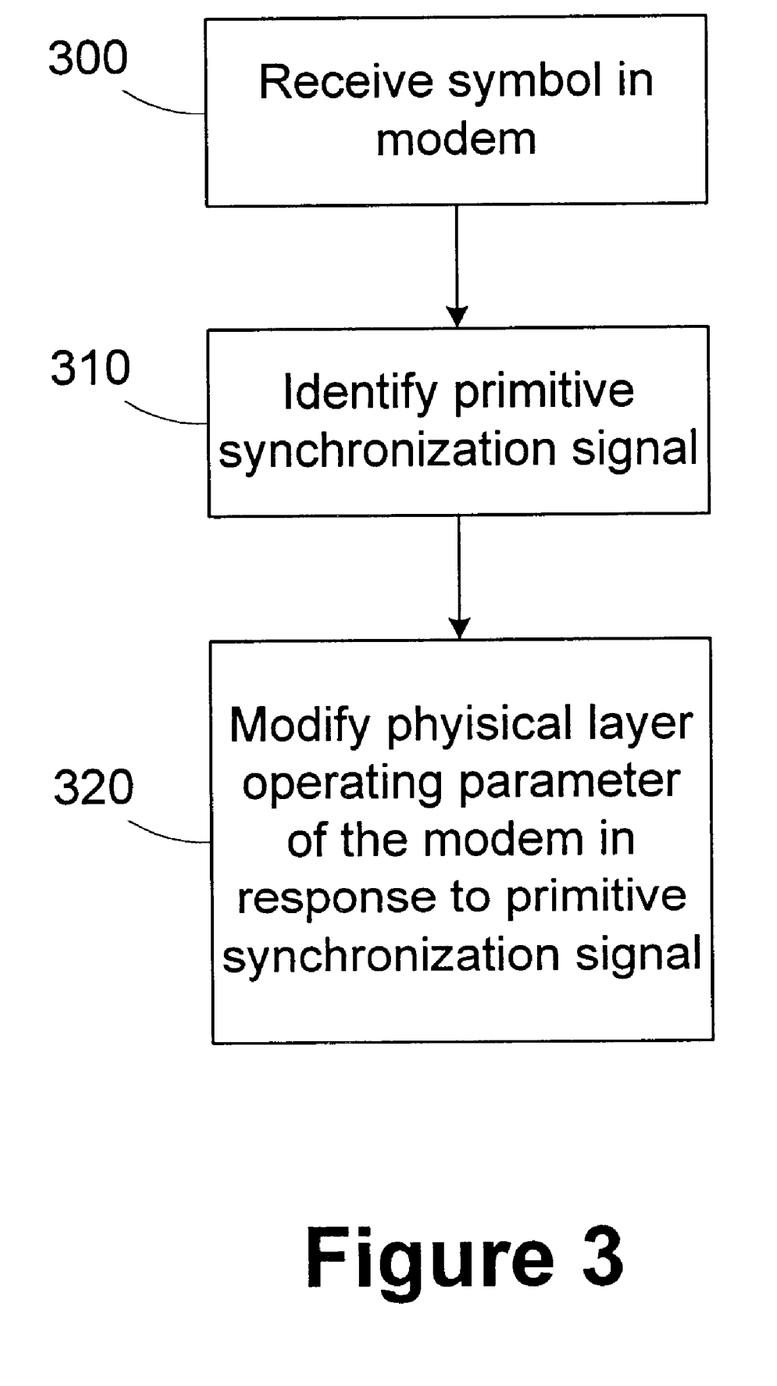
FIG. 3 is a flow diagram of a method for communicating messages requiring synchronization in accordance with the present invention.

Turning now to FIG. 3, a flow diagram of a method for communicating messages requiring synchronization is provided. In block 300, a symbol is received in a modem 100. The symbol is analyzed in block 310 to identify a primitive synchronization signal. A physical layer operating parameter of the modem 100 is modified in response to identifying the primitive synchronization signal in block 320.

Although the use of the physical layer acknowledgement signal is described above as how it may be implemented in a bit swap exchange, the application of the present invention is not so limited. It is contemplated that it may be used as a general purpose primitive synchronization signal throughout training, probing, and data modes. It may be used to coordinate power changes or changes in power management state. Current ADSL modems use open loop training procedures that rely on counting for alignment, rather than direct feedback. The primitive synchronization signal may be used during the training process to replace the counting technique.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications device, comprising:
    a first layer adapted to receive a plurality of transmit frames and modulate the transmit frames to generate transmit symbols based on a act of physical layer operating parameters; and
    a synchronization unit adapted to receive a primitive synchronization signal and change at least one of the physical layer operating parameters at a first time instant determined based on receipt of the primitive synchronization signal.

2. The communications device of claim 1, wherein first layer is adapted to receive a plurality of receive symbols and demodulate the receive symbols to generate a plurality of receive frames, and the primitive synchronization signal is encoded in one of the receive frames.

3. The communications device of claim 2, wherein each receive frame includes subsets of bits, each subset being associated with a particular tone, and the primitive synchronization signal is encoded in a most significant bit of at least one of the subsets.

4. The communications device of claim 2, wherein each receive frame includes subsets of bits, each subset being associated with a particular tone, and the primitive synchronization signal is encoded in at least one of the subsets.

5. The communications device of claim 1, wherein first layer is adapted to receive a plurality of receive symbols and the primitive synchronization signal is included in at least one of the receive symbols.

6. The communications device of claim 5, wherein the primitive synchronization signal comprises at least one of a predetermined number of consecutive synchronization symbols, a stoppage of the receive symbols for a predetermined number of symbols, a phase reversal of a pilot tone for at least one symbol, and a phase reversal of a synchronization symbol for at least one superframe.

7. The communications device of claim 2, wherein each receive frame includes subsets of bits, each subset being associated with a particular tone, and the physical layer operating parameter includes a number of bits in at least one of the subsets.

8. The communications device of claim 2, wherein each receive frame includes subsets of bits, each subset being associated with a particular tone, and the physical layer operating parameter includes a signal power associated with at least one of the subsets.

9. The communications device of claim 1, wherein at least one of the transmit frames includes a request to change one of the physical layer operating parameters.

10. The communications device of claim 2, wherein at least one of the receive frames includes a request to change one of the physical layer operating parameters.

11. The communications device of claim 2, wherein the receive symbol includes a plurality of tones, at least one of the tones being reserved for carrying the primitive synchronization signal.

12. A communications system, comprising:
a first modem adapted to modulate and demodulate data in accordance with a set of operating parameters and transmit a request to change one of the operating parameters; and
a second modem coupled to the first modem and being adapted to modulate and demodulate data in accordance with the set of operating parameters, receive the request to change one of the operating parameters, and send a primitive synchronization signal to the first modem, wherein the first modem is adapted to implement the change at a first time instant determined based on receipt of the primitive synchronization signal.

13. The communications system of claim 12, wherein the first modem is adapted to receive a plurality of receive symbols from the second modem, demodulate the receive symbols to generate a plurality of receive frames, and decode the receive frames to identify the primitive synchronization signal.

14. The communications system of claim 13, wherein each receive frame includes subsets of bits, each subset being associated with a particular tone, and the primitive synchronization signal is encoded in a most significant bit of at least one of the subsets.

15. The communications system of claim 13, wherein each receive frame includes subsets of bits, each subset being associated with a particular tone, and the primitive synchronization signal is encoded in at least one of the subsets.

16. The communications system of claim 12, wherein first modem is adapted to receive a plurality of receive symbols from the second modem, and the primitive synchronization signal is included in at least one of the receive symbols.

17. The communications system of claim 16, wherein the primitive synchronization signal comprises at least one of a predetermined number of consecutive synchronization symbols, a stoppage of the receive symbols for a predetermined number of symbols, a phase reversal of a pilot tone for at least one symbol, and a phase reversal of a synchronization symbol for at least one superframe.

18. The communications system of claim 13, wherein each receive frame includes subsets of bits, each subset being associated with a particular tone, and the operating parameter includes a number of bits in at least one of the subsets.

19. The communications system of claim 13, wherein each receive frame includes subsets of bits, each subset being associated with a particular tone, and the operating parameter includes a signal power associated with at least one of the subsets.

20. The communications device of claim 13, wherein the receive symbol includes a plurality of tones, at least one of the tones being reserved for carrying the primitive synchronization signal.

21. The communications system of claim 12, wherein the second modem is adapted to implement the change at a second time instant determined based on sending of the primitive synchronization signal.

22. The communications system of claim 12, wherein the first modem is adapted to implement the change at a second time instant determined based on sending of the primitive synchronization signal.

23. A communications system, comprising:
a first modem adapted to modulate and demodulate data in accordance with a set of operating parameters and transmit a request to change one of the operating parameters; and
a second modem coupled to the first modem and being adapted to modulate and demodulate data in accordance with the set of operating parameters, receive the request to change one of the operating parameters, and send an acknowledgement message to the first modem,
wherein the first modem is further adapted to send a primitive synchronization signal in response to receiving the acknowledgement message, and second modem is further adapted to implement the change in the set of operating parameters at a first time instant determined based on receipt of the primitive synchronization signal.

24. The communications system of claim 23, wherein the second modem is adapted to receive a plurality of receive symbols from the first modem, demodulate the receive symbols to generate a plurality of receive frames, and decode the receive frames to identify the primitive synchronization signal.

25. The communications system of claim 24, wherein each receive frame includes subsets of bits, each subset being associated with a particular tone, and the primitive synchronization signal is encoded in a most significant bit of at least one of the subsets.

26. The communications system of claim 24, wherein each receive frame includes subsets of bits, each subset being associated with a particular tone, and the primitive synchronization signal is encoded in at least one of the subsets.

27. The communications system of claim 23, wherein second modem is adapted to receive a plurality of receive symbols from the first modem, and the primitive synchronization signal is included in at least one of the receive symbols.

28. The communications system of claim 27, wherein the primitive synchronization signal comprises at least one of a predetermined number of consecutive synchronization symbols, a stoppage of the receive symbols for a predetermined number of symbols, a phase reversal of a pilot tone for at least one symbol, and a phase reversal of a synchronization symbol for at least one superframe.

29. The communications system of claim 24, wherein each receive frame includes subsets of bits, each subset being associated with a particular tone, and the operating parameter includes a number of bits in at least one of the subsets.

30. The communications system of claim 29, wherein each receive fame includes subsets of bits, each subset being associated with particular tone, and the operating parameter includes a signal power associated with at least one of the subsets.

31. The communications device of claim 24, wherein the receive symbol includes a plurality of tones, at least one of the tones being reserved for carrying the primitive synchronization signal.

32. A method for communicating messages requiring synchronization, comprising:
   receiving symbols in a modem;
   analyzing the symbols to identify a primitive synchronization signal; and
   modifying a physical layer operating parameter of the modem at a first time instant determined based on identification of the primitive synchronization signal.

33. The method of claim 32, wherein analyzing the symbols includes:
   demodulating the symbols to generate a plurality of receive frames; and
   decoding the receive frames to identify the primitive synchronization signal.

34. The method of claim 33, wherein each receive frame includes subsets of bits, each subset being associated with a particular tone, and decoding the receive frames includes decoding a most significant bit of at least one of the subsets.

35. The method of claim 33, wherein each receive frame includes subsets of bits, each subset being associated with a particular tone, and decoding the receive frames includes decoding at least one of the subsets.

36. The method of claim 32, wherein identifying the primitive synchronization signal comprises identifying at least one of a predetermined number of consecutive synchronization symbols, a stoppage of the receive symbols for a predetermined number of symbols, a phase reversal of a pilot tone for at least one symbol, and a phase reversal of a synchronization symbol for at least one superframe.

37. The method of claim 33, wherein each receive frame includes subsets of bits, each subset being associated with a particular tone, and modifying the physical layer operating parameter includes modifying a number of bits in at least one of the subsets.

38. The method of claim 33, wherein each receive frame includes subsets of bits, each subset being associated with a particular tone, and modifying the physical layer operating parameter includes modifying a signal power associated with at least one of the subsets.

39. The method of claim 32, further comprising modulating a transmit frame to generate a transmit symbol, wherein the transmit frame includes a request to change one of the physical layer operating parameters.

40. The method of claim 32, wherein at least one of the symbols includes a request to change one of the physical layer operating parameters.

41. The method of claim 32, wherein the symbols include a plurality of tones, and analyzing the symbols includes analyzing at least one tones reserved for carrying the primitive synchronization signal.

42. The method of claim 30, wherein the modem comprises a first modem; and the method further comprises:
   sending the primitive synchronization signal from a second modem; and
   modifying a physical layer operating parameter of the second modem at a second time instant determined based on the sending of the primitive synchronization signal.

43. An apparatus for communicating messages requiring synchronization, comprising:
   means for receiving symbols in a modem;
   means for analyzing the symbols to identify a primitive synchronization signal; and
   means for modifying a physical layer operating parameter of the modem at a first time instant determined based on identification of the primitive synchronization signal.

* * * * *

UNITED STATES PATENT AND TRADEMARK OFFICE
CERTIFICATE OF CORRECTION

PATENT NO.   : 6,714,589 B1
DATED        : March 30, 2004
INVENTOR(S)  : Terry L. Cole It is certified that error appears in the above-identified patent and that said Letters Patent is hereby corrected as shown below:

Column 8,
Line 35, replace "act" with -- set --.

Column 10,
Line 63, replace "29" with -- 24 --.
Line 64, replace "fame" with -- frame --.

Column 12,
Line 19, replace "30" with -- 32 --.

Signed and Sealed this

Twenty-fifth Day of May, 2004

JON W. DUDAS
*Acting Director of the United States Patent and Trademark Office*